US012148383B2

(12) United States Patent
Huang et al.

(10) Patent No.: US 12,148,383 B2
(45) Date of Patent: Nov. 19, 2024

(54) PIXEL CIRCUIT AND DRIVING METHOD THEREFOR, AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Yao Huang, Beijing (CN); Binyan Wang, Beijing (CN); Zhi Wang, Beijing (CN); Chao Wu, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/283,486

(22) PCT Filed: Nov. 10, 2021

(86) PCT No.: PCT/CN2021/129888
§ 371 (c)(1),
(2) Date: Sep. 22, 2023

(87) PCT Pub. No.: WO2022/199046
PCT Pub. Date: Sep. 29, 2022

(65) Prior Publication Data

US 2024/0177669 A1 May 30, 2024

(30) Foreign Application Priority Data

Mar. 23, 2021 (CN) ......................... 202110309409.1

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0842* (2013.01);
(Continued)

(58) Field of Classification Search
CPC ......... G09G 3/3233; G09G 2300/0819; G09G 2300/0842
See application file for complete search history.

(56) References Cited

U.S. PATENT DOCUMENTS 9,318,054 B2 4/2016 Lee et al.
10,916,188 B2 2/2021 Han
(Continued)

FOREIGN PATENT DOCUMENTS

CN 103137067 A 6/2013
CN 104282266 A 1/2015
(Continued)

OTHER PUBLICATIONS

International Search Report and Written Opinion mailed on Jan. 27, 2022, in corresponding PCT/CN2021/129888, 8 pages.
(Continued)

*Primary Examiner* — Koosha Sharifi-Tafreshi
(74) *Attorney, Agent, or Firm* — XSENSUS LLP

(57) ABSTRACT

A pixel circuit and a driving method therefor, and a display device are provided. The pixel circuit includes a driving subcircuit, a first light emitting control subcircuit, a second light emitting control subcircuit, a first switching subcircuit, a second switching subcircuit, a third switching subcircuit, a fourth switching subcircuit and an energy storage subcircuit.

18 Claims, 10 Drawing Sheets

(52) U.S. Cl.
CPC ............... *G09G 2310/0251* (2013.01); *G09G 2310/062* (2013.01); *G09G 2310/08* (2013.01)

(56) References Cited

U.S. PATENT DOCUMENTS

| | | | |
|---|---|---|---|
| 10,991,303 B2 | 4/2021 | Lee et al. | |
| 2013/0141316 A1 | 6/2013 | Lee et al. | |
| 2016/0063921 A1 | 3/2016 | Tsai et al. | |
| 2019/0073955 A1* | 3/2019 | Zou | G09G 3/3258 |
| 2019/0266942 A1 | 8/2019 | Han | |
| 2020/0126478 A1 | 4/2020 | Lee et al. | |

FOREIGN PATENT DOCUMENTS

| | | | |
|---|---|---|---|
| CN | 105590955 | A | 5/2016 |
| CN | 106991968 | A | 7/2017 |
| CN | 109523956 | A | 3/2019 |
| CN | 110189698 | A | 8/2019 |
| CN | 111916027 | A | 11/2020 |
| CN | 113053311 | A | 6/2021 |
| EP | 2602783 | A1 | 6/2013 |
| EP | 2602783 | B1 | 7/2018 |
| WO | 2013/064028 | A1 | 5/2013 |
| WO | 2015/149397 | A1 | 10/2015 |
| WO | 2016/032545 | A1 | 3/2016 |

OTHER PUBLICATIONS

Office Action issued on Nov. 22, 2021, in corresponding Chinese patent Application No. 202110309409.1, 18 pages.
Office Action issued on May 6, 2022, in corresponding Chinese patent Application No. 202110309409.1, 17 pages.
Decision of Rejection issued on Aug. 17, 2022, in corresponding Chinese patent Application No. 202110309409.1, 22 pages.

* cited by examiner

PIXEL CIRCUIT AND DRIVING METHOD THEREFOR, AND DISPLAY DEVICE

CROSS-REFERENCE TO RELATED APPLICATIONS

The present application is a U.S. National Stage of International Application No. PCT/CN2021/129888 filed on Nov. 10, 2021, which claims priority to Chinese Patent Application No. 202110309409.1, titled "Pixel Circuit and Driving Method therefor, and Display Device" filed on Mar. 23, 2021, the entire contents of each are incorporated herein by reference.

TECHNICAL FIELD

The present disclosure relates to the field of display technology, and specifically, to a pixel circuit and a driving method therefor, and a display device.

BACKGROUND

In an OLED (organic light emitting diode) display device, a light emitting unit is driven by an electric current to emit light. The light emitting unit receives different currents to display different brightness, i.e., the driving current of the light emitting unit corresponds to a grey scale of the light emitting unit. Moreover, at the end of displaying a frame, it is necessary to reset a light emitting element to prevent residual images or smears on a display panel. Therefore, a pixel circuit needs to be provided in the display panel to drive the light emitting unit to display the corresponding grey scale and reset the light emitting unit.

It is to be noted that the above information disclosed in the Background section is only for enhancement of understanding of the background of the present disclosure and therefore it may contain information that does not form the prior art that is already known to a person skilled in the art.

SUMMARY

The present disclosure provides a pixel circuit and a driving method thereof, and a display device.

A first aspect of the present disclosure provides a pixel circuit, including:

- a driving subcircuit with a first terminal connected to a first node, a second terminal connected to a second node, and a control terminal connected to a third node;
- a first light emitting control subcircuit with a first terminal connected to a first power supply terminal, a second terminal connected to the first node, and a control terminal connected to a first light emitting control terminal;
- a second light emitting control subcircuit with a first terminal connected to the second node, a second terminal connected to a first terminal of a light emitting element, and a control terminal connected to a second light emitting control terminal;
- a first switching subcircuit with a first terminal connected to a data signal terminal, a second terminal connected to the first node, and a control terminal connected to a first scanning signal terminal;
- a second switching subcircuit with a first terminal connected to an initialization terminal, a second terminal connected to the light emitting element, and a control terminal connected to a second scanning signal terminal;
- a third switching subcircuit with a first terminal connected to the second node, a second terminal connected to the third node, and a control terminal connected to the second scanning signal terminal;
- a fourth switching subcircuit with a first terminal connected to the second node,
- a second terminal connected to the third node, and a control terminal connected to the first scanning signal terminal: and
- an energy storage subcircuit with a first terminal connected to the first power supply terminal, and a second terminal connected to the third node, a second terminal of the light emitting element being connected to a second power supply terminal.

In an embodiment of the present disclosure, in a reset phase, the second switching subcircuit and the third switching subcircuit are turned on in response to a second scanning signal, and the second light emitting subcircuit is turned on in response to a second light emitting control signal to output an initialization signal to the third node and the second terminal of the light emitting element: in a data writing phase, the first switching subcircuit and the fourth switching subcircuit are turned on in response to a first scanning signal to write a data signal to the energy storage subcircuit: and in a light emitting phase, the driving subcircuit is turned on in response to the data signal in the energy storage subcircuit, the first light emitting control subcircuit is turned on in response to the first light emitting control signal, and the second light emitting control subcircuit is turned on in response to the second light emitting control signal to transmit a driving current to the light emitting element.

In an embodiment of the present disclosure, the first switching subcircuit includes:

a first transistor with a first terminal connected to the data signal terminal, a second terminal connected to the first node, and a control terminal connected to the first scanning signal terminal, wherein the first transistor is turned on in response to the first scanning signal during the data writing phase to transmit the data signal to the first node.

In an embodiment of the present disclosure, the second switching subcircuit includes:

a second transistor with a first terminal connected to the initialization terminal, a second terminal connected to the first terminal of the light emitting element, and a control terminal connected to the second scanning signal terminal, wherein the second transistor is turned on in response to the second scanning signal during the reset phase to transmit the reset signal to the first terminal of the light emitting element.

In an embodiment of the present disclosure, the third switching subcircuit includes:

a third transistor with a first terminal connected to the second node, a second terminal connected to the third node, and a control terminal connected to the second scanning signal terminal, wherein the third transistor is turned on in response to the second scanning signal during the reset phase to transmit the reset signal to the third node.

In an embodiment of the present disclosure, the fourth switching subcircuit includes:

a fourth transistor with a first terminal connected to the second node, a second terminal connected to the third node, and a control terminal connected to the first scanning signal terminal, wherein the fourth transistor is turned on in response to the first scanning signal during the data writing phase to transmit the data signal to the third node.

In an embodiment of the present disclosure, the first light emitting control subcircuit includes:

a fifth transistor with a first terminal connected to the first power supply terminal, a second terminal connected to the first node, and a control terminal connected to the first light emitting control signal terminal, wherein the fifth transistor is turned on in response to the first light emitting control signal during the charging phase to transmit the first power signal to the first node.

In an embodiment of the present disclosure, the second light emitting control subcircuit includes:

a sixth transistor with a first terminal connected to the second node and a second terminal connected to the first terminal of the light emitting element, wherein the sixth transistor is turned on in response to the second light emitting control signal during the reset phase to turn on the first switching subcircuit and the third switching subcircuit, and the sixth transistor is turned on in response to the second light emitting control signal during the light emitting phase to turn on the driving subcircuit and the light emitting element.

A second aspect of the present disclosure provides a method for driving a pixel circuit, applied to the pixel circuit described above, and including:

- with a first scanning signal, a second scanning signal, a first light emitting control signal and a second light emitting control signal, turning on the second switching subcircuit, the second light emitting control subcircuit and the third switching subcircuit, and turning off the first light emitting control circuit, the driving subcircuit, the first switching subcircuit and the fourth switching subcircuit, to reset the third node and the light emitting element;
- with the first scanning signal, the second scanning signal, the first light emitting control signal and the second light emitting control signal, turning on the first switching subcircuit, the fourth switching subcircuit and the driving subcircuit, and turning off the first light emitting control subcircuit, the second light emitting control subcircuit, the second switching subcircuit and the third switching subcircuit, to write a data signal to the energy storage subcircuit; and
- with the first scanning signal, the second scanning signal, the first light emitting control signal and the second light emitting control signal, turning on the first light emitting control subcircuit, the second light emitting control subcircuit and the driving subcircuit, and turning off the first switching subcircuit, the second switching subcircuit, the third switching subcircuit and the fourth switching subcircuit, to generate a driving current to drive the light emitting element to emit light.

A third aspect of the present disclosure provides a display device including the pixel circuit described above.

It should be understood that the above general description and the detailed descriptions that follow are only exemplary and explanatory and do not limit the present disclosure.

BRIEF DESCRIPTION OF THE DRAWINGS

The foregoing and other features and advantages of the present disclosure will become more apparent by describing the example embodiments thereof in detail with reference to the accompanying drawings.

DETAILED DESCRIPTION

Figure 1:
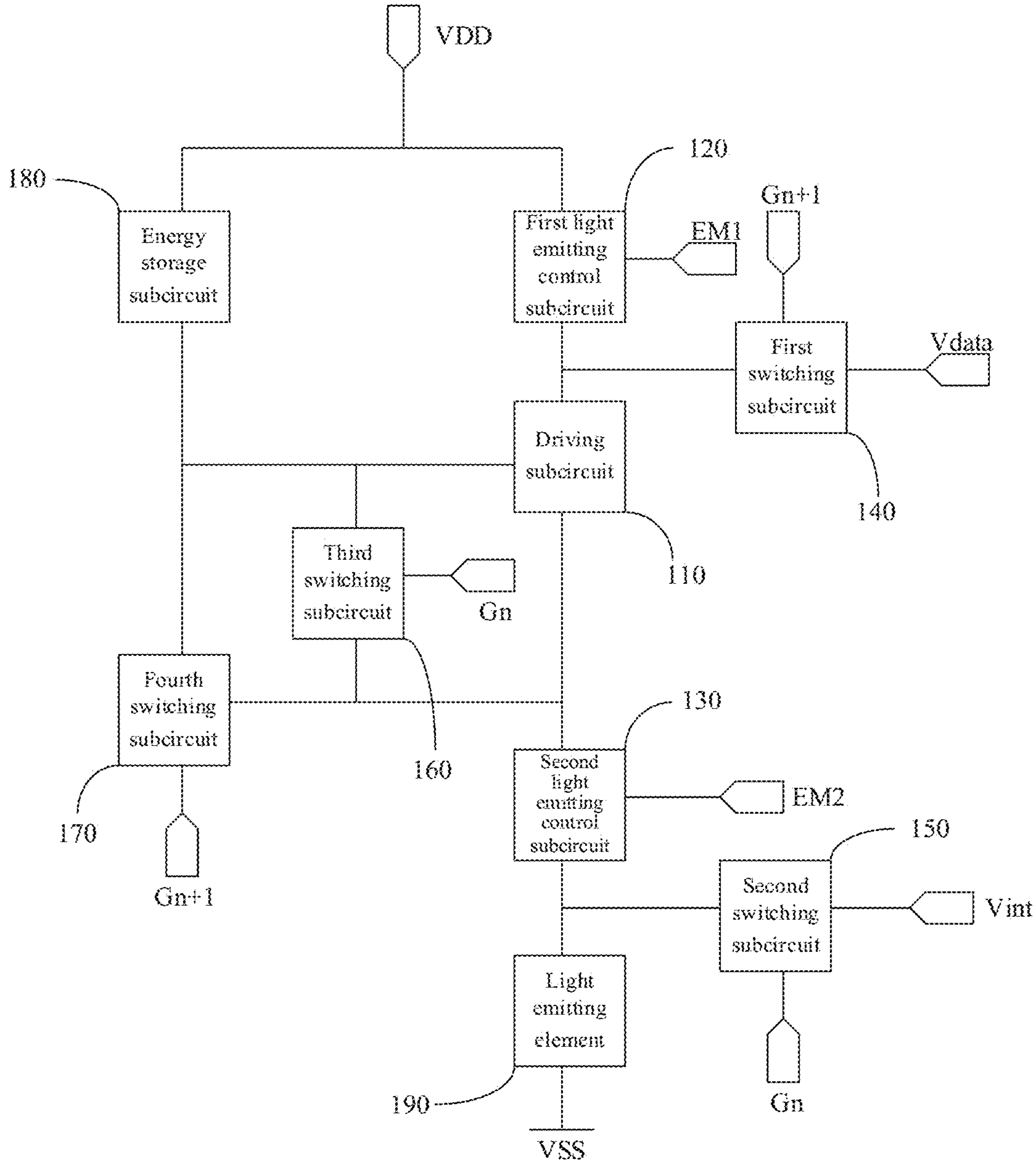
FIG. 1 is a schematic block diagram of a pixel circuit according to an embodiment of the present disclosure.

Example embodiments will now be described more fully with reference to the accompanying drawings. However, the example embodiments can be implemented in a variety of forms and should not be construed as being limited to the embodiments set forth herein; rather, these embodiments are provided so that the present disclosure is comprehensive and complete and the concept of the example embodiments is conveyed completely to a person skilled in the art. The same reference numbers in the drawings denote the same or similar parts, and thus repetitive descriptions thereof will be omitted.

In addition, the described features, structures or characteristics may be combined in one or more embodiments in any suitable manner. In the following description, many specific details are provided to give a full understanding of the embodiments of the present disclosure. However, a person skilled in the art will realize that the technical solution of the present disclosure may be practiced without one or more of the particular details described, or by other methods, components, materials, devices, steps, and the like. In other cases, the well-known structures, methods, devices, implementations, materials, or operations are not shown or described in detail to avoid obscuring aspects of the present disclosure.

The block diagrams shown in the accompanying drawings are merely functional entities and do not necessarily have to correspond to physically separate entities. That is, these functional entities may be implemented in software form, or these functional entities or a part thereof may be implemented in one or more software-hardened modules, or these functional entities are implemented in different networks and/or processor devices and/or microcontroller devices.

An embodiment of the present disclosure first provides a pixel circuit. As shown in FIG. 1, the pixel circuit includes a driving subcircuit 110, a first light emitting control subcircuit 120, a second light emitting control subcircuit 130, a first switching subcircuit 140, a second switching subcircuit 150, a third switching subcircuit 160, a fourth switching subcircuit 170, and an energy storage subcircuit 180. The driving subcircuit 110 has a first terminal connected to a first node, a second terminal connected to a second node, and a control terminal connected to a third node. The first light emitting control subcircuit 120 has a first terminal connected to a first power supply terminal, a second terminal connected to the first node, and a control terminal connected to a first light emitting control terminal. The second light emitting control subcircuit 130 has a first terminal connected to the second node, a second terminal connected to a first terminal of a light emitting element 190, and a control terminal connected to a second light emitting control terminal. The first switching subcircuit 140 has a first terminal connected to a data signal terminal, a second terminal connected to the first node, and a control terminal connected to a first scanning signal terminal. The second switching subcircuit 150 has a first terminal connected to an initialization terminal, a second terminal connected to the light emitting element 190, and a control terminal connected to a second scanning signal terminal. The third switching subcircuit 160 has a first terminal connected to the second node, a second terminal connected to the third node, and a control terminal connected to the second scanning signal terminal. The fourth switching subcircuit 170 has a first terminal connected to the second node, a second terminal connected to the third node, and a control terminal connected to the first scanning signal terminal. The energy storage subcircuit 180 has a first terminal connected to the first power supply terminal, and a second terminal connected to the third node. A second terminal of the light emitting element 190 is connected to a second power supply terminal.

In the pixel circuit according to the embodiment of the present disclosure, the first switching subcircuit 140 and the fourth switching subcircuit 170 are turned on through a first scanning signal Gn+1 to write a data signal Vdata to the energy storage subcircuit 180 and thus turn on the driving subcircuit 110. The first light emitting control subcircuit 120 is turned on through a first light emitting control signal EM1, and the second light emitting control subcircuit 130 is turned on through a second light emitting control signal EM2, to form a driving current for driving the light emitting element 190 to display a corresponding grey scale. The second switching subcircuit 150 and the third switching subcircuit 160 are turned on through a second scanning signal Gn, and the second light emitting control subcircuit 130 is turned on through the second light emitting control signal EM2 to reset the light emitting element 190. A new 7T1C pixel circuit is provided that can increase the diversity of the pixel circuit.

Various parts of the pixel circuit according to an embodiment of the present disclosure will be described in detail below:

The operating process of the pixel circuit according to an embodiment of the present disclosure may include a reset phase, a data writing phase, and a light emitting phase.

In the reset phase, the second switching subcircuit 150 and the third switching subcircuit 160 are turned on in response to a second scanning signal Gn, and the second light emitting subcircuit is turned on in response to a second light emitting control signal EM2 to output an initialization signal Vint to the third node and the second terminal of the light emitting element 190.

In the data writing phase, the first switching subcircuit 140 and the fourth switching subcircuit 170 are turned on in response to a first scanning signal Gn+1 to write a data signal Vdata to the energy storage subcircuit 180.

In the charging phase, the first light emitting control subcircuit 120 is turned on in response to a first light emitting control signal EM1 to write a first power signal VDD to the first node.

In the light emitting phase, the driving subcircuit 110 is turned on in response to the data signal Vdata in the energy storage subcircuit 180, the first light emitting control subcircuit 120 is turned on in response to the first light emitting control signal EM1, and the second light emitting control subcircuit 130 is turned on in response to the second light emitting control signal EM2 to transmit a driving current to the light emitting element 190.

Figure 2:
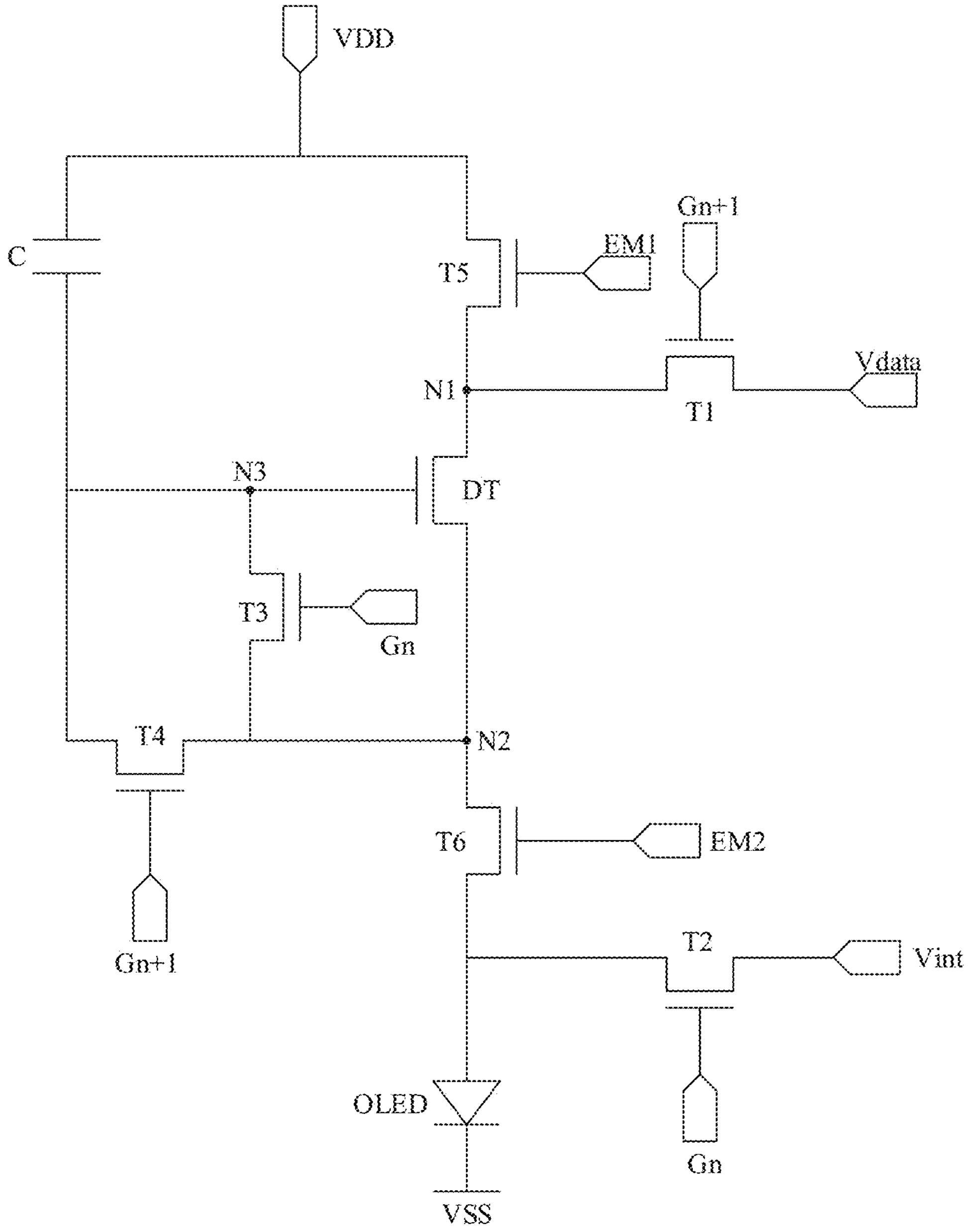
FIG. 2 is an equivalent circuit diagram of a pixel circuit according to an embodiment of the present disclosure.

As shown in FIG. 2, the driving subcircuit 110 includes a driving transistor DT with a first terminal connected to the first node, a second terminal connected to the second node, and a control terminal connected to the third node. The driving transistor DT is turned on in response to the data signal Vdata in the energy storage subcircuit, and the driving transistor DT is used for controlling the driving current of the light emitting element 190.

The first switching subcircuit 110 includes a first transistor T1 with a first terminal connected to the data signal terminal, a second terminal connected to the first node, and a control terminal connected to the first scanning signal terminal, and the first transistor T1 is turned on in response to the first scanning signal Gn+1 during the data writing phase to transmit the data signal Vdata to the first node.

The second switching subcircuit 150 includes a second transistor T2 with a first terminal connected to the initialization terminal, a second terminal connected to the first terminal of the light emitting element 190, and a control terminal connected to the second scanning signal terminal, and the second transistor T2 is turned on in response to the second scanning signal Gn during the reset phase to transmit the reset signal Vint to the first terminal of the light emitting element 190.

The third switching subcircuit 160 includes a third transistor T3 with a first terminal connected to the second node, a second terminal connected to the third node, and a control terminal connected to the second scanning signal terminal, and the third transistor T3 is turned on in response to the second scanning signal Gn during the reset phase to transmit the reset signal Vint to the third node.

The fourth switching subcircuit 170 includes a fourth transistor T4 with a first terminal connected to the second node, a second terminal connected to the third node, and a control terminal connected to the first scanning signal terminal, and the fourth transistor T4 is turned on in response to the first scanning signal Gn+1 during the data writing phase to transmit the data signal Vdata to the third node.

The first light emitting control subcircuit 120 includes a fifth transistor T5 with a first terminal connected to the first power supply terminal, a second terminal connected to the first node, and a control terminal connected to the first light emitting control signal terminal EM1, and the fifth transistor T5 is turned on in response to the first light emitting control signal EM1 during the charging phase and the light emitting phase to transmit the first power signal VDD to the first node.

The second light emitting control subcircuit 130 includes a sixth transistor T6 with a first terminal connected to the second node, a second terminal connected to the first terminal of the light emitting element 190, and a control terminal connected to the second light emitting control terminal. The sixth transistor T6 is turned on in response to the second light emitting control signal EM2 during the reset phase to turn on the first switching subcircuit 140 and the third switching subcircuit 160, and the sixth transistor T6 is turned on in response to the second light emitting control signal EM2 during the light emitting phase to turn on the driving subcircuit 110 and the light emitting element 190.

The energy storage subcircuit 180 includes an energy storage capacitor C. The energy storage capacitor C has a first terminal connected to the first power supply terminal, and a second terminal connected to the third node, and the energy storage capacitor C is charged during the data writing phase to be written with the data signal Vdata. The energy storage capacitor C is discharged during the reset phase to eliminate the data signal Vdata of a previous frame.

In an embodiment of the present disclosure, each transistor has a control terminal, a first terminal, and a second terminal. Specifically, the control terminal of each transistor may be a gate electrode, the first terminal may be a source electrode, and the second terminal may be a drain electrode. Alternatively, the control terminal of each transistor may be a gate electrode, the first terminal may be a drain electrode, and the second terminal may be a source electrode. In addition, each transistor may also be an enhancement type transistor or a depletion type transistor, which is not specifically limited in the embodiment of the present disclosure.

The first scanning signal Gn+1 may be provided by a scanning line in the (n+1)th row; and the second scanning signal Gn may be provided by a scanning line in the nth row: The first scanning signal Gn+1 and the second scanning signal Gn are adjacent to each other, and the second scanning signal Gn is earlier than the first scanning signal Gn+1.

On this basis, all the transistors may be P-type thin film transistors, and the driving voltage of each transistor is a low level voltage. In this case, the first power signal VDD may be a high level signal, the second power signal VSS may be a low level signal, the first terminal of the light emitting element 190 is an anode of the OLED, and the second terminal of the light emitting element 190 is a cathode of the OLED.

Alternatively, all of the transistors may be N-type thin film transistors, and the driving voltage of each transistor is a high level voltage. In this case, the first power signal VDD may be a low level signal, the second power signal VSS may be a high level signal, the first terminal of the light emitting element 190 is the cathode of the OLED, and the second terminal of the light emitting element 190 is the anode of the OLED.

In the following, the operating process of the pixel circuit according to embodiment of the present disclosure is described in conjunction with FIGS. 2 and 3 by taking all the transistors being P-type transistors as an example. The driving voltage of each transistor is a low level voltage. In this case, the first power signal VDD may be a high level signal, the second power signal VSS may be a low level signal, the first terminal of the light emitting element 190 is the anode of the OLED, and the second terminal of the light emitting element 190 is the cathode of the OLED.

Figure 4:
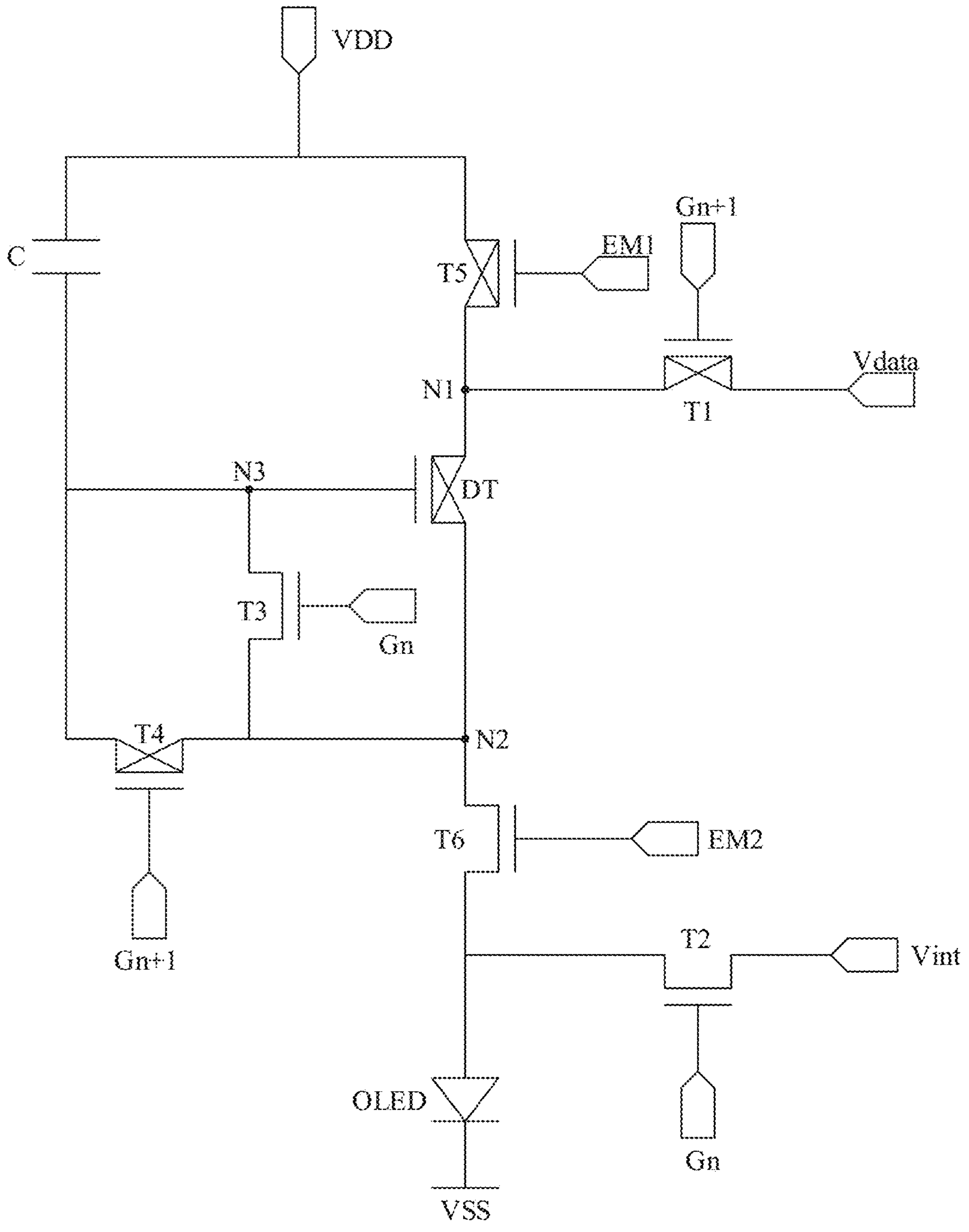
FIG. 4 is a schematic diagram of a turning on state in a pixel circuit during a time period t1 according to an embodiment of the present disclosure.

In the t1 time period (reset phase), the second scanning signal Gn and the second light emitting control signal EM2 are at a low level, and the first scanning signal Gn+1 and the first light emitting control signal EM1 are at a high level. As shown in FIG. 4, the second transistor T2 and the third transistor T3 are turned on in response to the second scanning signal Gn, and the sixth transistor T6 is turned on in response to the second light emitting control signal EM2 to output the reset signal Vint to the third node and the second terminal of the light emitting element 190. The first transistor T1 and the fourth transistor T4 are turned off in response to the first scanning signal Gn+1, and the fifth transistor T5 is turned off in response to the first light emitting control signal EM1.

Figure 5:
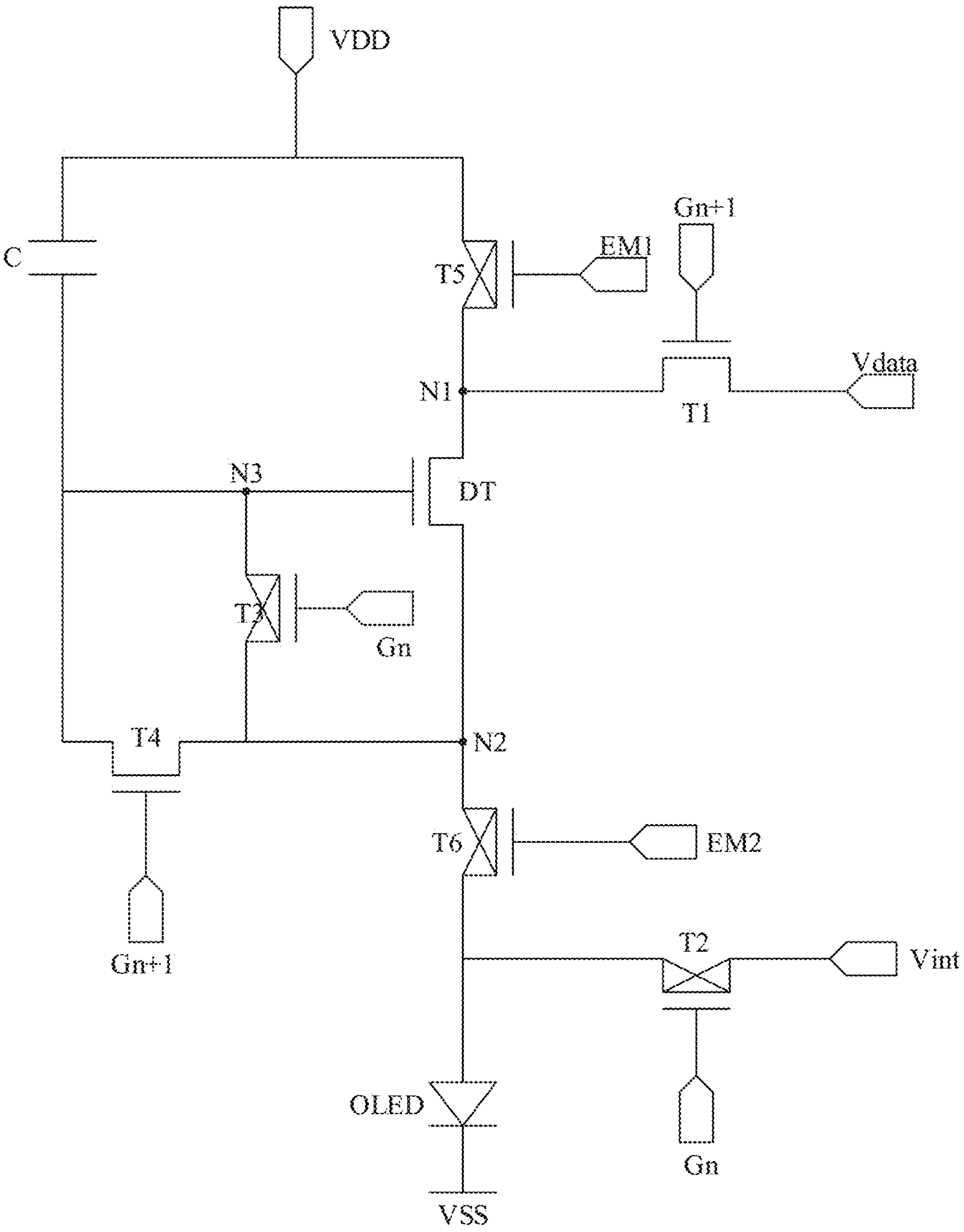
FIG. 5 is a schematic diagram of a turning on state in a pixel circuit during a time period t2 according to an embodiment of the present disclosure.

At the t2 time period (data writing phase), the first scanning signal Gn+1 is at a low level, the second scanning signal Gn is at a high level, the first light emitting control signal EM1 is at a high level, and the second light emitting control signal EM2 is at a high level. As shown in FIG. 5, the first transistor T1 and the fourth transistor T4 are turned on in response to the first scanning signal Gn+1 to write the data signal Vdata to the energy storage subcircuit 180, the second transistor T2 and the third transistor T3 are turned off in response to the second scanning signal Gn, the fifth transistor T5 is turned off in response to the first light emitting control signal EM1, and the sixth transistor T6 is turned off in response to the second light emitting control signal EM2.

Figure 6:
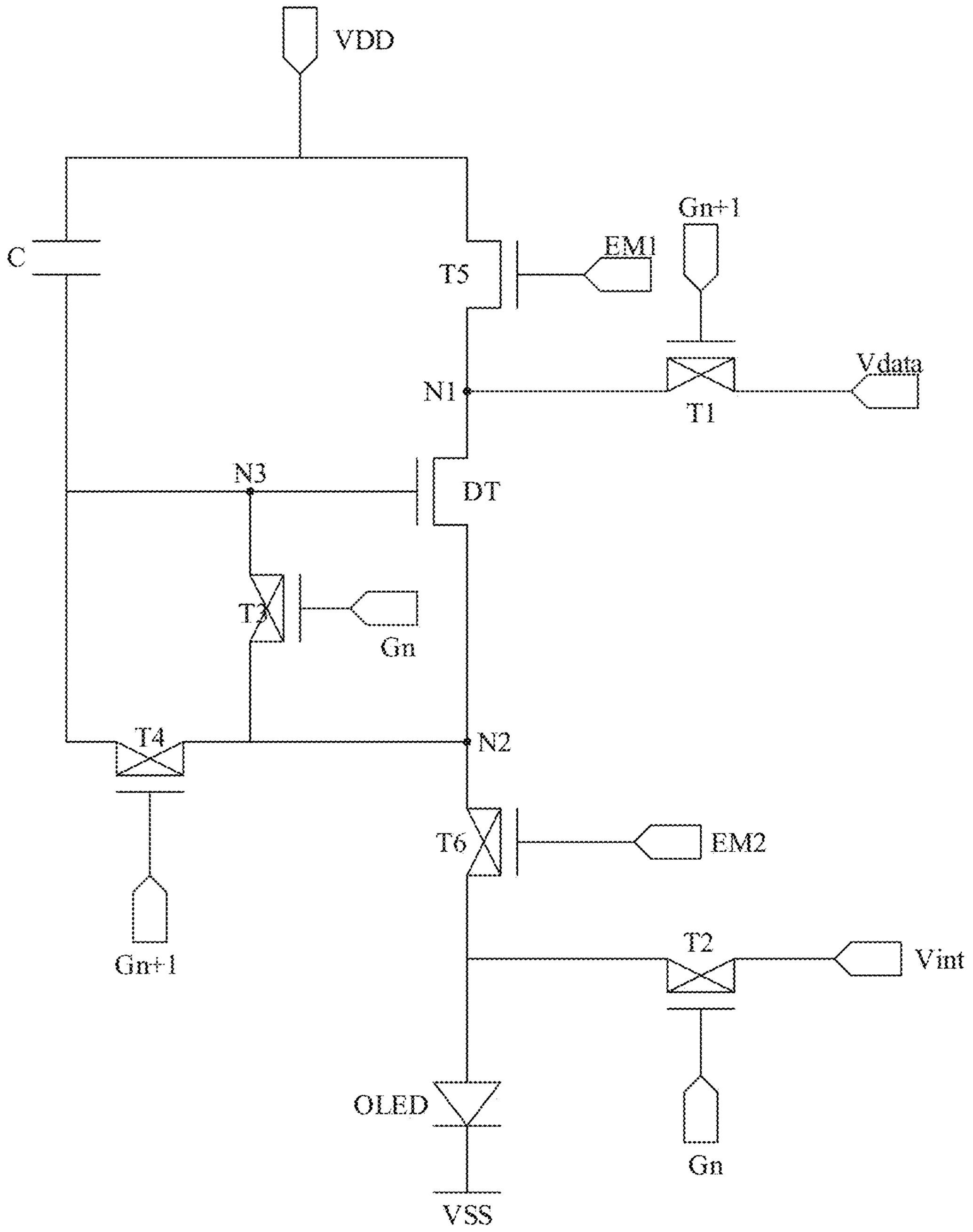
FIG. 6 is a schematic diagram of a turning on state in a pixel circuit during a time period t3 according to an embodiment of the present disclosure.

In the t3 time period (charging phase), the first scanning signal Gn+1, the second scanning signal Gn, and the second light emitting control signal EM2 are at a high level, and the first light emitting control signal EM1 is at a low level. As shown in FIG. 6, the fifth transistor T5 is turned on in response to the first light emitting control signal EM1, and the first power signal charges the first node. The first transistor T1 and the fourth transistor T4 are turned off in response to the first scanning signal Gn+1, the second transistor T2 and the third transistor T3 are turned off in response to the second scanning signal Gn, and the sixth transistor T6 is turned off in response to the second light emitting control signal EM2.

Figure 7:
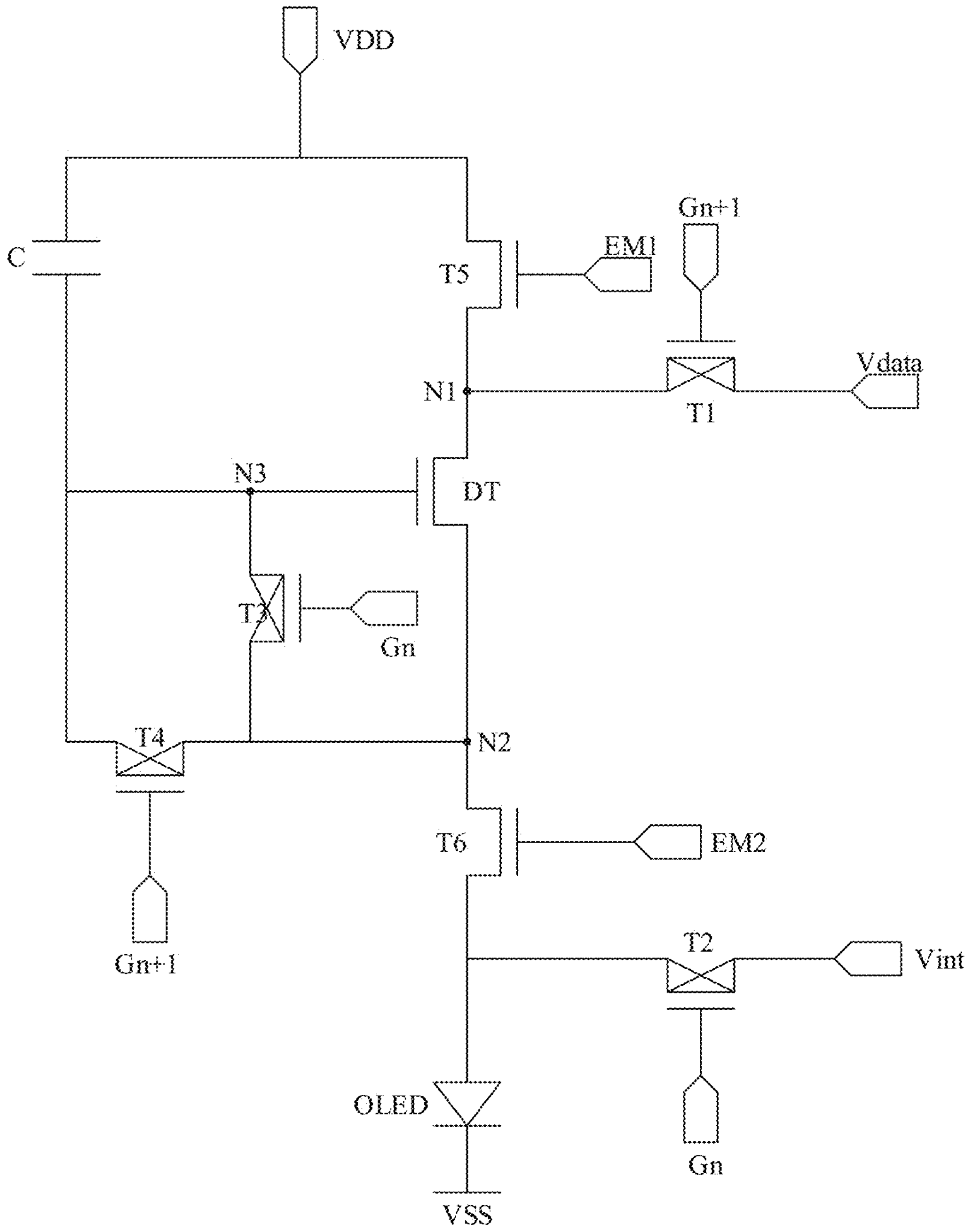
FIG. 7 is a schematic diagram of a turning on state in a pixel circuit during a time period t4 according to an embodiment of the present disclosure.

In the t4 time period (light emitting phase), the first scanning signal Gn+1 and the second scanning signal Gn are at a high level, and the first light emitting control signal EM1 and the second light emitting control signal EM2 are at a low level. As shown in FIG. 7, the driving transistor DT is turned on in response to the data signal Vdata in the energy storage capacitor C, the fifth transistor T5 is turned on in response to the first light emitting control signal EM1, and the sixth transistor T6 is turned on in response to the second light emitting control signal EM2 to transmit the driving current to the light emitting element 190. The first transistor T1 and the fourth transistor T4 are turned off in response to the first scanning signal Gn+1, and the second transistor T2 and the third transistor T3 are turned off in response to the second scanning signal Gn.

Figure 8:
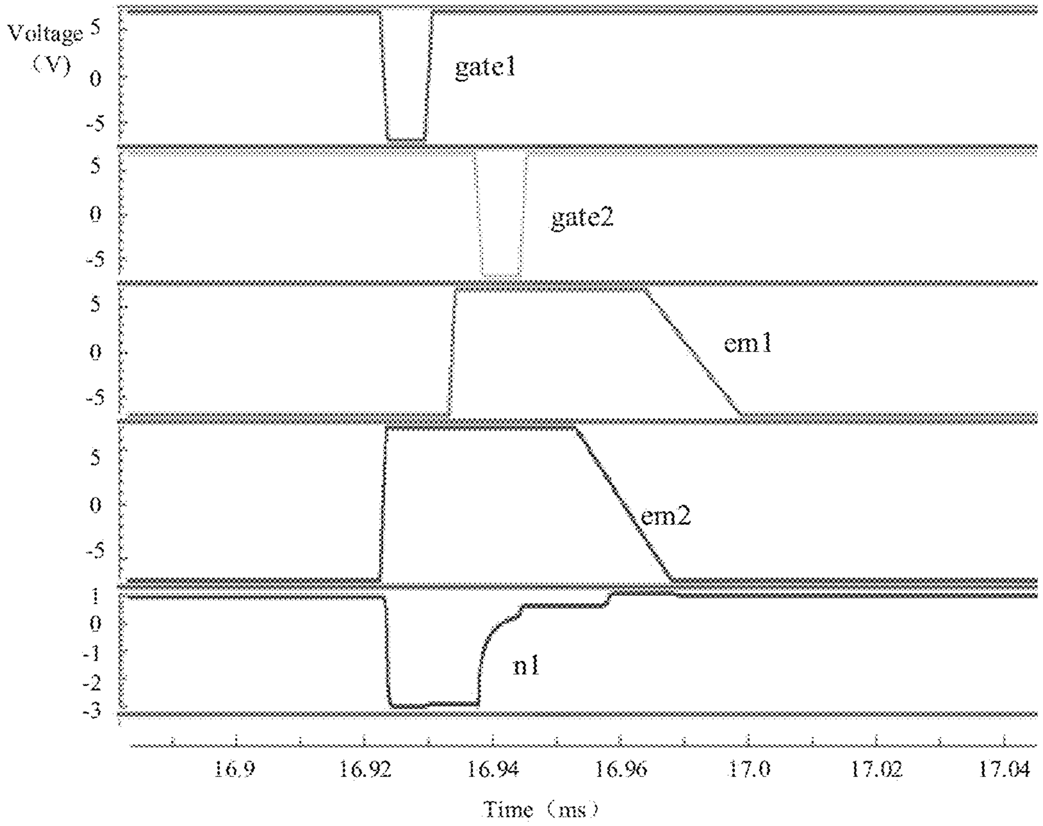
FIG. 8 is a simulation diagram of a pixel circuit according to an embodiment of the present disclosure.

The circuit simulation waveform of each signal in the pixel circuit according to an embodiment of the present disclosure is shown in FIG. 8, in which the horizontal axis is the time axis and the vertical axis is the voltage, the second scanning signal Gn is shown as the curve gate1, the first scanning signal Gn+1 is shown as the curve gate2, the first light emitting control signal EM1 is shown as the curve em1, the second light emitting control signal EM2 is shown as the curve em2, and the electrical signal at the third node is shown as the curve n1. As can be obtained from FIG. 8, the driving process and operating efficiency of the pixel circuit according to the embodiment of the present disclosure are qualified.

It should be noted that in the specific embodiments described above, all transistors are P-type transistors, which has the advantages of: for example, strong noise suppression: for example, easy charging management as the P-type transistor being turned on at a low level: for example, a simple manufacture process and a relatively low cost of the P-type thin film transistor: for example, a relatively good stability of the P-type thin film transistor, and so on. However, a person skilled in the art can easily obtain a pixel driving circuit in which all transistors are N-type transistors based on the pixel driving circuit provided in the present disclosure. In an embodiment of the present disclosure, all transistors may be N-type transistors. Of course, the pixel driving circuit provided in the present disclosure may also be modified to be a CMOS (complementary metal oxide semiconductor) circuit and the like, and is not limited to the pixel circuit provided in the embodiment, which will not be repeated herein.

In the pixel circuit according to the embodiment of the present disclosure, the first switching subcircuit 140 and the fourth switching subcircuit 170 are turned on through the first scanning signal Gn+1 to write the data signal Vdata to the energy storage subcircuit 180 and thus turn on the driving subcircuit 110. The first light emitting control subcircuit 120 is turned on through the first light emitting control signal EM1, and the second light emitting control subcircuit 130 is turned on through the second light emitting control signal EM2, to form the driving current for driving the light emitting element 190 to display a corresponding grey scale. The second switching subcircuit 150 and the third switching subcircuit 160 are turned on through the second scanning signal Gn, and the second light emitting control subcircuit 130 is turned on through the second light emitting control signal EM2 to reset the light emitting element 190.

Figure 9:
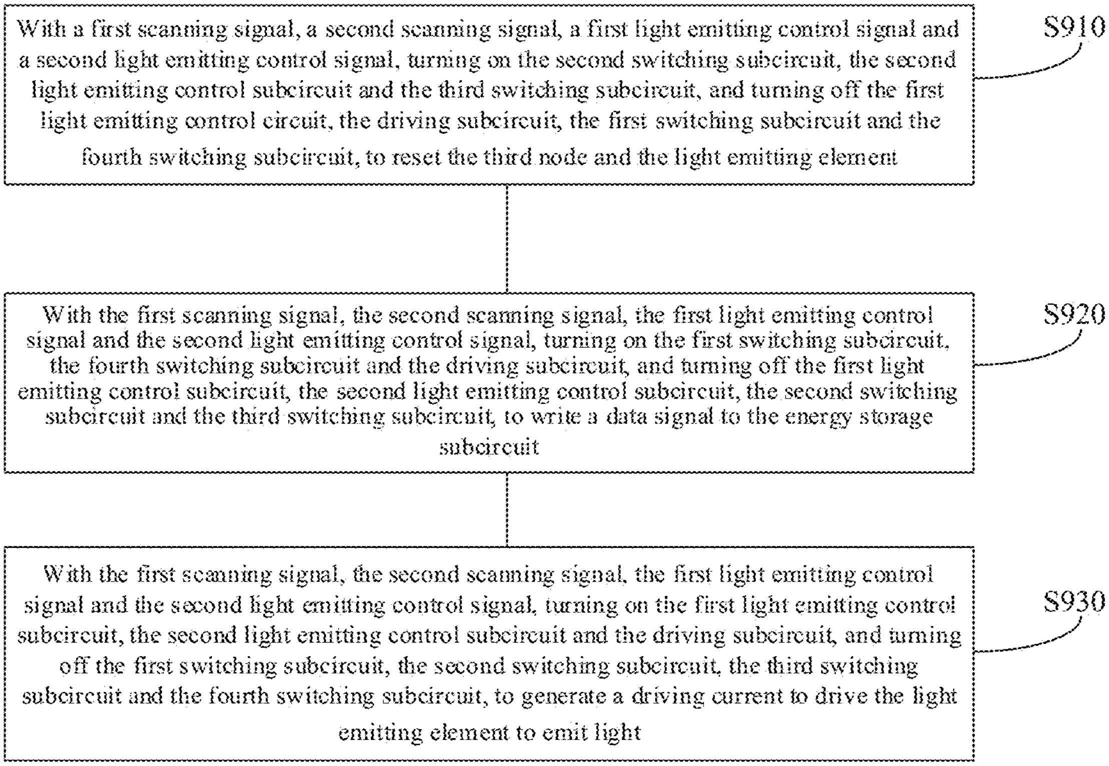
FIG. 9 is a flowchart of a method for driving a pixel circuit according to an embodiment of the present disclosure.

An embodiment of the present disclosure also provides a method for driving a pixel circuit which is applied to the above-described pixel circuit. As shown in FIG. 9, the method for driving the pixel circuit includes:

- step S910, with a first scanning signal, a second scanning signal, a first light emitting control signal and a second light emitting control signal, turning on the second switching subcircuit, the second light emitting control subcircuit 130 and the third switching subcircuit, and turning off the first light emitting control circuit, the driving subcircuit, the first switching subcircuit and the fourth switching subcircuit, to reset the third node and the light emitting element;
- step S920, with the first scanning signal, the second scanning signal, the first light emitting control signal and the second light emitting control signal, turning on the first switching subcircuit, the fourth switching subcircuit and the driving subcircuit, and turning off the first light emitting control subcircuit, the second light emitting control subcircuit, the second switching subcircuit and the third switching subcircuit, to write a data signal Vdata to the energy storage subcircuit; and
- step S930, with the first scanning signal, the second scanning signal, the first light emitting control signal and the second light emitting control signal, turning on the first light emitting control subcircuit, the second light emitting control subcircuit and the driving subcircuit, and turning off the first switching subcircuit, the second switching subcircuit, the third switching subcircuit and the fourth switching subcircuit, to generate a driving current to drive the light emitting element to emit light.

In the method for driving the pixel circuit according to the embodiment of the present disclosure, the first switching subcircuit 140 and the fourth switching subcircuit 170 are turned on through the first scanning signal Gn+1 to write the data signal Vdata to the energy storage subcircuit 180 and thus turn on the driving subcircuit 110. The first light emitting control subcircuit 120 is turned on through the first light emitting control signal EM1, and the second light emitting control subcircuit 130 is turned on through the second light emitting control signal EM2, to form the driving current for driving the light emitting element 190 to display a corresponding grey scale. The second switching subcircuit 150 and the third switching subcircuit 160 are turned on through the second scanning signal Gn, and the second light emitting control subcircuit 130 is turned on through the second light emitting control signal EM2 to reset the light emitting element 190.

Figure 10:
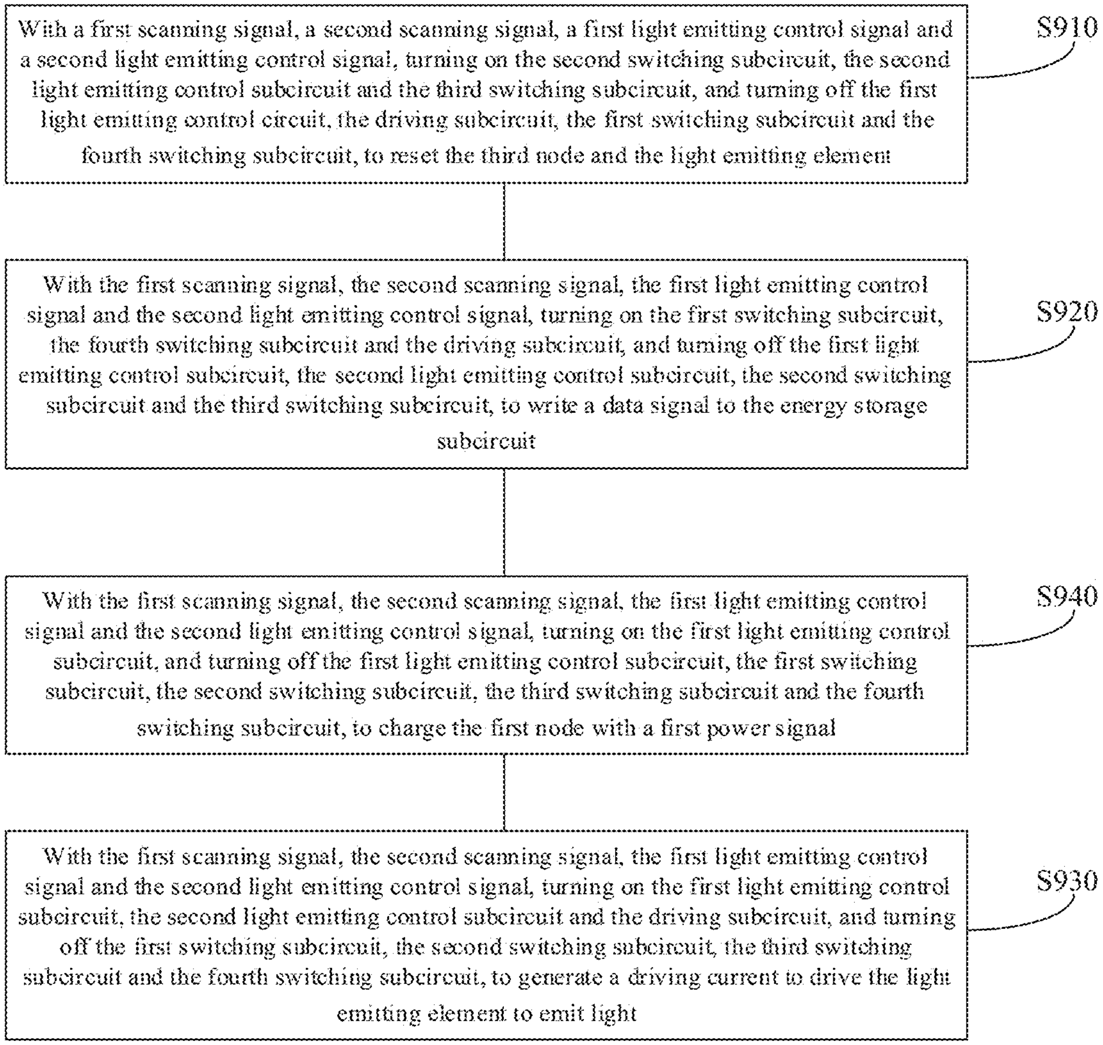
FIG. 10 is a flowchart of another method for driving a pixel circuit according to an embodiment of the present disclosure.

Further, as shown in FIG. 10, the driving method of the pixel circuit according to an embodiment of the present disclosure may further include:

step S940, with the first scanning signal, the second scanning signal, the first light emitting control signal and the second light emitting control signal, turning on the first light emitting control subcircuit, and turning off the second light emitting control subcircuit, the first switching subcircuit, the second switching subcircuit, the third switching subcircuit and the fourth switching subcircuit, to charge the first node with a first power signal.

In step S910, it may, with a first scanning signal Gn+1, a second scanning signal Gn, a first light emitting control signal EM1 and a second light emitting control signal EM2, turn on the second switching subcircuit 150, the second light emitting control subcircuit 130 and the third switching subcircuit 160, and turn off the first light emitting control circuit 120, the driving subcircuit 110, the first switching subcircuit 140 and the fourth switching subcircuit 170, to reset the third node and the light emitting element 190.

Figure 3:
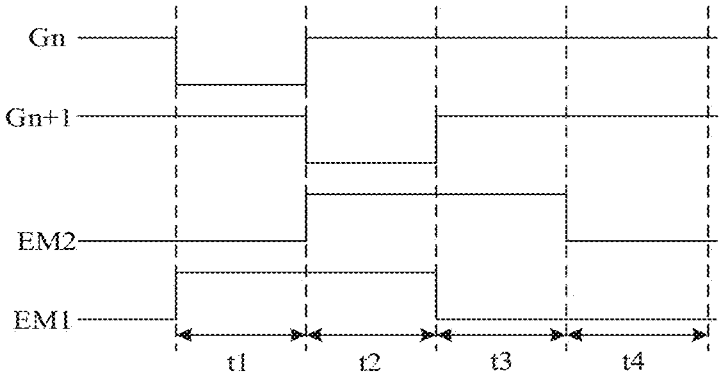
FIG. 3 is a driving timing diagram of a pixel circuit according to an embodiment of the present disclosure.

Referring to the timing diagram of the pixel circuit shown in FIG. 3, step S910 is executed at the time period t1, the second scanning signal Gn and the second light emitting control signal EM2 are at a low level, and the first scanning signal Gn+1 and the first light emitting control signal EM1 are at a high level. The second transistor T2 and the third transistor T3 are turned on in response to the second scanning signal Gn, and the sixth transistor T6 is turned on in response to the second light emitting control signal EM2 to output the reset signal Vint to the third node and the second terminal of the light emitting element 190. The first transistor T1 and the fourth transistor T4 are turned off in response to the first scanning signal Gn+1, and the fifth transistor T5 is turned off in response to the first light emitting control signal EM1.

In step S920, it may, with the first scanning signal Gn+1, the second scanning signal Gn, the first light emitting control signal EM1 and the second light emitting control signal EM2, turn on the first switching subcircuit 140, the fourth switching subcircuit 170 and the driving subcircuit 110, and turn off the first light emitting control subcircuit 120, the second light emitting control subcircuit 130, the second switching subcircuit 150 and the third switching subcircuit 160, to write a data signal Vdata to the energy storage subcircuit 180.

Referring to the timing diagram of the pixel circuit shown in FIG. 3, step S920 is executed at the time period t2, the first scanning signal Gn+1 is at a low level, the second scanning signal Gn is at a high level, the first light emitting control signal EM1 is at a high level, and the second light emitting control signal EM2 is at a high level. The first transistor T1 and the fourth transistor T4 are turned on in response to the first scanning signal Gn+1 to write the data signal Vdata to the energy storage subcircuit 180, the second transistor T2 and the third transistor T3 are turned off in response to the second scanning signal Gn, the fifth transistor T5 is turned off in response to the first light emitting control signal EM1, and the sixth transistor T6 is turned off in response to the second light emitting control signal EM2.

In step S940, it may, with the first scanning signal Gn+1, the second scanning signal Gn, the first light emitting control signal EM1 and the second light emitting control signal EM2, turn on the first light emitting control subcircuit 120, and turn off the second light emitting control subcircuit 130, the first switching subcircuit 140, the second switching subcircuit 150, the third switching subcircuit 160 and the fourth switching subcircuit 170, to charge the first node with a first power signal VDD.

Referring to the timing diagram of the pixel circuit shown in FIG. 3, step S930 is executed at the time period t3, the first scanning signal Gn+1, the second scanning signal Gn, and the second light emitting control signal EM2 are at a high level, and the first light emitting control signal EM1 is at a low level. The fifth transistor T5 is turned on in response to the first light emitting control signal EM1, and the first power signal charges the first node. The first transistor T1 and the fourth transistor T4 are turned off in response to the first scanning signal Gn+1, the second transistor T2 and the third transistor T3 are turned off in response to the second scanning signal Gn, and the sixth transistor T6 is turned off in response to the second light emitting control signal EM2.

In step S930, it may, with the first scanning signal Gn+1, the second scanning signal Gn, the first light emitting control signal EM1 and the second light emitting control signal EM2, turn on the first light emitting control subcircuit 120, the second light emitting control subcircuit 130 and the driving subcircuit 110, and turn off the first switching subcircuit 140, the second switching subcircuit 150, the third switching subcircuit 160 and the fourth switching subcircuit 170, to generate a driving current to drive the light emitting element 190 to emit light.

Referring to the timing diagram of the pixel circuit shown in FIG. 3, step S930 is executed at the time period t4, the first scanning signal Gn+1 and the second scanning signal Gn are at a high level, and the first light emitting control signal EM1 and the second light emitting control signal EM2 are at a low level. The driving transistor DT is turned on in response to the data signal Vdata in the energy storage capacitor C, the fifth transistor T5 is turned on in response to the first light emitting control signal EM1, and sixth transistor T6 is turned on in response to the second light emitting control signal EM2 to transmit the driving current to the light emitting element 190. The first transistor T1 and the fourth transistor T4 are turned off in response to the first scanning signal Gn+1, and the second transistor T2 and the third transistor T3 are turned off in response to the second scanning signal Gn.

It is noted that although the various steps of the method in the present disclosure are described in the accompanying drawings in a particular order, it is not required or implied that the steps must be performed in that particular order or that all of the steps shown must be performed in order to achieve the desired result. Additionally or alternatively, certain steps may be omitted, a plurality of steps may be combined into a single step to be performed, and/or a single step may be divided into a plurality of steps to be performed, or the like.

Furthermore, the above-described accompanying drawings are only schematic illustrations of the process included in the method according to the embodiment of the present disclosure, and are not intended to as limitation. It is readily understood that the processes shown in the above-described accompanying drawings do not indicate or limit the chronological order of these processes. It is also readily understood that the processes may be performed, for example, synchronously or asynchronously in a plurality of modules.

An embodiment of the present disclosure also provides a display device including the pixel circuitry described above.

The pixel circuit includes a driving subcircuit 110, a first light emitting control subcircuit 120, a second light emitting control subcircuit 130, a first switching subcircuit 140, a second switching subcircuit 150, a third switching subcircuit 160, a fourth switching subcircuit 170, and an energy storage subcircuit 180. The driving subcircuit 110 has a first terminal connected to a first node, a second terminal connected to a second node, and a control terminal connected to a third node. The first light emitting control subcircuit 120 has a first terminal connected to a first power supply terminal, a second terminal connected to the first node, and a control terminal connected to a first light emitting control terminal. The second light emitting control subcircuit 130 has a first terminal connected to the second node, a second terminal connected to a first terminal of a light emitting element 190, and a control terminal connected to a second light emitting control terminal. The first switching subcircuit 140 has a first terminal connected to a data signal terminal, a second terminal connected to the first node, and a control terminal connected to a first scanning signal terminal. The second switching subcircuit 150 has a first terminal connected to an initialization terminal, a second terminal connected to the light emitting element 190, and a control terminal connected to a second scanning signal terminal. The third switching subcircuit 160 has a first terminal connected to the second node, a second terminal connected to the third node, and a control terminal connected to the second scanning signal terminal. The fourth switching subcircuit 170 has a first terminal connected to the second node, a second terminal connected to the third node, and a control terminal connected to the first scanning signal terminal. The energy storage subcircuit 180 has a first terminal connected to the first power supply terminal, and a second terminal connected to the third node. A second terminal of the light emitting element 190 is connected to a second power supply terminal.

The display device may include a plurality of pixel circuits, the plurality of pixel circuits are arranged in an array on the display panel, and each pixel circuit corresponds to one pixel unit. The display device may also include a plurality of scan lines and a plurality of data lines, the plurality of scan lines are used to provide a scan signal line by line, and the plurality of data lines are used to provide a plurality of data signals. The plurality of pixel circuits are connected to the corresponding data lines and scan lines respectively.

The display device may, for example, include any product or component with a display function such as a mobile phone, a tablet computer, a television, a laptop computer, a digital photo frame, a navigator, an e-reader and a wearable device.

A person skilled in the art may easily conceive of other embodiments of the present disclosure after considering the specification and practicing what is disclosed herein. The present application is intended to cover any variations, uses or adaptations of the present disclosure that follow the general principle of the present disclosure and include the common knowledge and the conventional technical means in the art that are not disclosed herein. The description and embodiments are considered to be exemplary only and the true scope and spirit of the present disclosure is indicated by the claims.

It should be understood that the present disclosure is not limited to the precise construction already described above and illustrated in the accompanying drawings, and that various modifications and changes may be made without departing from the scope thereof. The scope of the present disclosure is limited only by the appended claims.

What is claimed is:

1. A pixel circuit, comprising:

a driving subcircuit with a first terminal connected to a first node, a second terminal connected to a second node, and a control terminal connected to a third node;

a first light emitting control subcircuit with a first terminal connected to a first power supply terminal, a second terminal connected to the first node, and a control terminal connected to a first light emitting control terminal;

a second light emitting control subcircuit with a first terminal connected to the second node, a second terminal connected to a first terminal of a light emitting element, and a control terminal connected to a second light emitting control terminal;

a first switching subcircuit with a first terminal connected to a data signal terminal, a second terminal connected to the first node, and a control terminal connected to a first scanning signal terminal;

a second switching subcircuit with a first terminal connected to an initialization terminal, a second terminal connected to the light emitting element, and a control terminal connected to a second scanning signal terminal;

a third switching subcircuit with a first terminal connected to the second node, a second terminal connected to the third node, and a control terminal connected to the second scanning signal terminal;

a fourth switching subcircuit with a first terminal connected to the second node, a second terminal connected to the third node, and a control terminal connected to the first scanning signal terminal; and an energy storage subcircuit with a first terminal connected to the first power supply terminal, and a second terminal connected to the third node, a second terminal of the light emitting element being connected to a second power supply terminal.

2. The pixel circuit according to claim 1, wherein in a reset phase, the second switching subcircuit and the third switching subcircuit are turned on in response to a second scanning signal, and the second light emitting subcircuit is turned on in response to a second light emitting control signal to output an initialization signal to the third node and the second terminal of the light emitting element;

in a data writing phase, the first switching subcircuit and the fourth switching subcircuit are turned on in response to a first scanning signal to write a data signal to the energy storage subcircuit;

in a charging phase, the first light emitting control subcircuit is turned on in response to a first light emitting control signal to write a first power signal to the first node; and in a light emitting phase, the driving subcircuit is turned on in response to the data signal in the energy storage subcircuit, the first light emitting control subcircuit is turned on in response to the first light emitting control signal, and the second light emitting control subcircuit is turned on in response to the second light emitting control signal to transmit a driving current to the light emitting element.

3. The pixel circuit according to claim 2, wherein the first switching subcircuit comprises:

a first transistor with a first terminal connected to the data signal terminal, a second terminal connected to the first node, and a control terminal connected to the first scanning signal terminal, wherein the first transistor is turned on in response to the first scanning signal during the data writing phase to transmit the data signal to the first node.

4. The pixel circuit according to claim 2, wherein the second switching subcircuit comprises:

a second transistor with a first terminal connected to the initialization terminal, a second terminal connected to the first terminal of the light emitting element, and a control terminal connected to the second scanning signal terminal, wherein the second transistor is turned on in response to the second scanning signal during the reset phase to transmit the reset signal to the first terminal of the light emitting element.

5. The pixel circuit according to claim 2, wherein the third switching subcircuit comprises:

a third transistor with a first terminal connected to the second node, a second terminal connected to the third node, and a control terminal connected to the second scanning signal terminal, wherein the third transistor is turned on in response to the second scanning signal during the reset phase to transmit the reset signal to the third node.

6. The pixel circuit according to claim 2, wherein the fourth switching subcircuit comprises:

a fourth transistor with a first terminal connected to the second node, a second terminal connected to the third node, and a control terminal connected to the first scanning signal terminal, wherein the fourth transistor is turned on in response to the first scanning signal during the data writing phase to transmit the data signal to the third node.

7. The pixel circuit according to claim 2, wherein the first light emitting control subcircuit comprises:

a fifth transistor with a first terminal connected to the first power supply terminal, a second terminal connected to the first node, and a control terminal connected to the first light emitting control signal terminal, wherein the fifth transistor is turned on in response to the first light emitting control signal during the charging phase and the light emitting phase to transmit the first power signal to the first node.

8. The pixel circuit according to claim 2, wherein the second light emitting control subcircuit comprises:

a sixth transistor with a first terminal connected to the second node, a second terminal connected to the first terminal of the light emitting element, and a control terminal connected to the second light emitting control terminal, wherein the sixth transistor is turned on in response to the second light emitting control signal during the reset phase to turn on the first switching subcircuit and the third switching subcircuit, and the sixth transistor is turned on in response to the second light emitting control signal during the light emitting phase to turn on the driving subcircuit and the light emitting element.

9. A method for driving a pixel circuit, applied to the pixel circuit according to claim 1, and comprising:

with a first scanning signal, a second scanning signal, a first light emitting control signal and a second light emitting control signal, turning on the second switching subcircuit, the second light emitting control subcircuit and the third switching subcircuit, and turning off the first light emitting control circuit, the driving subcircuit, the first switching subcircuit and the fourth switching subcircuit, to reset the third node and the light emitting element;

with the first scanning signal, the second scanning signal, the first light emitting control signal and the second light emitting control signal, turning on the first switching subcircuit, the fourth switching subcircuit and the driving subcircuit, and turning off the first light emitting control subcircuit, the second light emitting control subcircuit, the second switching subcircuit and the third switching subcircuit, to write a data signal to the energy storage subcircuit; and with the first scanning signal, the second scanning signal, the first light emitting control signal and the second light emitting control signal, turning on the first light emitting control subcircuit, the second light emitting control subcircuit and the driving subcircuit, and turning off the first switching subcircuit, the second switching subcircuit, the third switching subcircuit and the fourth switching subcircuit, to generate a driving current to drive the light emitting element to emit light.

10. The method for driving the pixel circuit according to claim 9, further comprising:

with the first scanning signal, the second scanning signal, the first light emitting control signal and the second light emitting control signal, turning on the second light emitting control subcircuit, and turning off the first light emitting control subcircuit, the first switching subcircuit, the second switching subcircuit, the third switching subcircuit and the fourth switching subcircuit, to charge the first node with a first power signal.

11. A display device, comprising a pixel circuit, wherein the pixel circuit comprises:

a driving subcircuit with a first terminal connected to a first node, a second terminal connected to a second node, and a control terminal connected to a third node;

a first light emitting control subcircuit with a first terminal connected to a first power supply terminal, a second terminal connected to the first node, and a control terminal connected to a first light emitting control terminal;

a second light emitting control subcircuit with a first terminal connected to the second node, a second terminal connected to a first terminal of a light emitting element, and a control terminal connected to a second light emitting control terminal;

a first switching subcircuit with a first terminal connected to a data signal terminal, a second terminal connected to the first node, and a control terminal connected to a first scanning signal terminal;

a second switching subcircuit with a first terminal connected to an initialization terminal, a second terminal connected to the light emitting element, and a control terminal connected to a second scanning signal terminal;

a third switching subcircuit with a first terminal connected to the second node, a second terminal connected to the third node, and a control terminal connected to the second scanning signal terminal;

a fourth switching subcircuit with a first terminal connected to the second node, a second terminal connected to the third node, and a control terminal connected to the first scanning signal terminal; and an energy storage subcircuit with a first terminal connected to the first power supply terminal, and a second terminal connected to the third node, a second terminal of the light emitting element being connected to a second power supply terminal.

12. The display device according to claim 11, wherein in a reset phase, the second switching subcircuit and the third switching subcircuit are turned on in response to a second scanning signal, and the second light emitting subcircuit is turned on in response to a second light emitting control signal to output an initialization signal to the third node and the second terminal of the light emitting element;

in a data writing phase, the first switching subcircuit and the fourth switching subcircuit are turned on in response to a first scanning signal to write a data signal to the energy storage subcircuit;

in a charging phase, the first light emitting control subcircuit is turned on in response to a first light emitting control signal to write a first power signal to the first node; and in a light emitting phase, the driving subcircuit is turned on in response to the data signal in the energy storage subcircuit, the first light emitting control subcircuit is turned on in response to the first light emitting control signal, and the second light emitting control subcircuit is turned on in response to the second light emitting control signal to transmit a driving current to the light emitting element.

13. The display device according to claim 12, wherein the first switching subcircuit comprises:

a first transistor with a first terminal connected to the data signal terminal, a second terminal connected to the first node, and a control terminal connected to the first scanning signal terminal, wherein the first transistor is turned on in response to the first scanning signal during the data writing phase to transmit the data signal to the first node.

14. The display device according to claim 12, wherein the second switching subcircuit comprises:

a second transistor with a first terminal connected to the initialization terminal, a second terminal connected to the first terminal of the light emitting element, and a control terminal connected to the second scanning signal terminal, wherein the second transistor is turned on in response to the second scanning signal during the reset phase to transmit the reset signal to the first terminal of the light emitting element.

15. The display device according to claim 12, wherein the third switching subcircuit comprises:

a third transistor with a first terminal connected to the second node, a second terminal connected to the third node, and a control terminal connected to the second scanning signal terminal, wherein the third transistor is turned on in response to the second scanning signal during the reset phase to transmit the reset signal to the third node.

16. The display device according to claim 12, wherein the fourth switching subcircuit comprises:

a fourth transistor with a first terminal connected to the second node, a second terminal connected to the third node, and a control terminal connected to the first scanning signal terminal, wherein the fourth transistor is turned on in response to the first scanning signal during the data writing phase to transmit the data signal to the third node.

17. The display device according to claim 12, wherein the first light emitting control subcircuit comprises:

a fifth transistor with a first terminal connected to the first power supply terminal, a second terminal connected to the first node, and a control terminal connected to the first light emitting control signal terminal, wherein the fifth transistor is turned on in response to the first light emitting control signal during the charging phase and the light emitting phase to transmit the first power signal to the first node.

18. The display device according to claim 12, wherein the second light emitting control subcircuit comprises:

a sixth transistor with a first terminal connected to the second node, a second terminal connected to the first terminal of the light emitting element, and a control terminal connected to the second light emitting control terminal, wherein the sixth transistor is turned on in response to the second light emitting control signal during the reset phase to turn on the first switching subcircuit and the third switching subcircuit, and the sixth transistor is turned on in response to the second light emitting control signal during the light emitting phase to turn on the driving subcircuit and the light emitting element.

* * * * *